United States Patent Office 2,864,821
Patented Dec. 16, 1958

2,864,821

N-(PYRAZINOYL)-GLYCINE

Julius D. Taylor, Waukegan, Ill., assignor to Abbott Laboratories, North Chicago, Ill., a corporation of Illinois No Drawing. Application September 24, 1957
Serial No. 685,827

2 Claims. (Cl. 260—250)

This invention relates to a new chemical compound, pyrazinoyl glycine, and to a novel method for making the same. The chemical compound of this invention is characterized by the ability to lower the blood sugar concentration upon oral administration. The chemical formula of the compound is

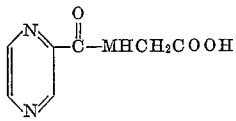

and is made by reacting equimolar proportions of pyrazinoyl chloride and glycine, as shown in the following example. The compound may also be prepared by reacting equimolar amounts of pyrazinoic acid and ethyl chloroformate to form pyrazinoic carbonic anhydride and reacting this intermediate with an equimolar portion of glycerine.

The following example is given in order to disclose the invention in detail.

Example 18 gms. (.24 mole) of glycine, 17.8 gms. (.24 mole) lithium carbonate, and 75 cc. of water are stirred at 0° C. and 30 gms. (.24 mole) of crude pyrazinoyl chloride is added portionwise over a period of 30 minutes. This solution is stirred for two hours between 0–4° C. and then filtered. A precipitate forms and is recrystallized from 150 cc. of water to obtain 8.5 gms. of the product, pyrazinoyl glycerine, which is found to have a melting point of 229–230° C. Calculated analysis for C, 46.40%; H, 3.89%; N, 23.19%; O, 26.49%. Found: C, 46.26%; H, 4.07%; N, 23.3%; O, 26.63%.

I claim:
1. N-(pyrazinoyl)-glycine.
2. The method of making N-(pyrazinoyl)-glycine which comprises mixing together about equimolar proportions of pyrazinoyl chloride and glycine in an aqueous medium, filtering the solidified reaction product and recovering N-(pyrazinoyl)-glycine.

No references cited.